United States Patent
Hochstein

(10) Patent No.: US 6,573,490 B2
(45) Date of Patent: Jun. 3, 2003

(54) INTERLEAVED MOSAIC IMAGING RAIN SENSOR

(75) Inventor: Peter A. Hochstein, Troy, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 09/894,557

(22) Filed: Jun. 28, 2001

(65) Prior Publication Data

US 2003/0001121 A1 Jan. 2, 2003

(51) Int. Cl.[7] ............................. G02B 6/42
(52) U.S. Cl. ................ 250/227.25; 250/208.1; 250/573; 340/602
(58) Field of Search ................ 318/444, 483, 318/481; 250/573, 208.1, 227.25; 340/602; 15/DIG. 15

(56) References Cited

U.S. PATENT DOCUMENTS

| | | | |
|---|---|---|---|
| 4,164,868 A | 8/1979 | Suntola | 73/336.5 |
| 4,476,419 A | 10/1984 | Fukatsu et al. | 318/444 |
| 4,595,866 A | 6/1986 | Fukatsu et al. | 318/444 |
| 4,636,643 A | 1/1987 | Nakamura et al. | 250/338 |
| 4,639,831 A | 1/1987 | Iyoda | 361/286 |
| 4,676,638 A | 6/1987 | Yasuda | 356/237 |
| 4,805,070 A | 2/1989 | Koontz et al. | 361/286 |
| 4,827,198 A | 5/1989 | Mueller et al. | 318/483 |
| 4,831,493 A | 5/1989 | Wilson et al. | 361/286 |
| 4,867,561 A | 9/1989 | Fujii et al. | |
| 4,960,996 A | 10/1990 | Hochstein | |
| 5,059,877 A * | 10/1991 | Teder | 318/444 |
| 5,313,072 A | 5/1994 | Vachss | 250/573 |
| 5,537,003 A | 7/1996 | Bechtel et al. | 315/82 |
| 5,668,478 A | 9/1997 | Buschur | 324/693 |
| RE35,762 E * | 4/1998 | Zimmerman | 250/574 |
| 5,923,027 A | 7/1999 | Stam et al. | 250/208.1 |
| 6,020,704 A | 2/2000 | Buschur | 318/483 |
| 6,084,519 A * | 7/2000 | Coulling et al. | 340/602 |
| 6,144,022 A * | 11/2000 | Tenenbaum et al. | 250/208.1 |
| 6,262,410 B1 * | 7/2001 | Stam et al. | 250/208.1 |
| 6,320,176 B1 * | 11/2001 | Schofield et al. | 250/208.1 |
| 6,376,824 B1 * | 4/2002 | Michenfelder et al. | 250/214 R |
| 6,392,218 B1 * | 5/2002 | Kuehnle | 250/208.1 |

FOREIGN PATENT DOCUMENTS

| | | |
|---|---|---|
| DE | 19742093 | 3/1999 |
| JP | 9189533 | 7/1997 |
| WO | WO 97/29926 | 8/1997 |

* cited by examiner

Primary Examiner—Stephone B. Allen
Assistant Examiner—Christopher W. Glass
(74) Attorney, Agent, or Firm—Howard & Howard

(57) ABSTRACT

A plurality of the first L1 and second L2 image sensor elements are interleaved with one another. The first image sensor elements L1 has a peak response at the first wavelength $\lambda 1$ for capturing an illuminated image of the glass and objects on the glass containing a first wavelength $\lambda 1$ from an infrared illuminator (12). The second image sensor element L2 has a peak response at a second wavelength $\lambda 2$ for capturing an ambient image of light rays at the second wavelength $\lambda 2$ passing through the glass (10) from the exterior to the interior surfaces simultaneously with the capture by the first image sensor element L1. Instead of storing two complete sequential images and differentially subtracting them, the present invention creates two simultaneous images from a specially interleaved, single imager (14).

10 Claims, 3 Drawing Sheets

RELATIVE BANDPASS (TRANSMISSION) RESPONSE
CHARACTERISTIC OF MOSAIC OR STRIPE FILTERS

ALTERNATING L1 & L2 FILTER TILES

INTERLEAVED MOSAIC IMAGING RAIN SENSOR

RELATED APPLICATION

This application is an improvement over co-pending application Ser. No. 09/835,755 filed Apr. 16, 2001, and assigned to the assignee of the subject invention.

BACKGROUND OF THE INVENTION

1. Field of the Invention

The subject invention relates to a rain sensor for detecting moisture on the windshield of a vehicle for turning on the windshield wipers, moisture taking the form of mist, water drops, as a film, frost, ice, snow, fog, etc.

2. Description of the Prior Art

The co-pending application Ser. No. 09/835,755 filed Apr. 16, 2001 Attorney Docket No.: 65165.007 entitled DIFFERENTIAL IMAGING RAIN SENSOR discloses a method for achieving greatly improved moisture detection performance through the application of synchronous, differential detection principles. In essence, acquisition and storage of a baseline signal value allows that signal level to be subtracted from a subsequent measurement that includes this background value plus a level indicative of the measured variable. In accordance therewith, that invention provides a method for sensing moisture on the exterior surface of a sheet of glass including the step of capturing an ambient image of light rays passing through the glass from the exterior to the interior surfaces thereof under ambient light conditions. The method is characterized by illuminating the glass with light rays, capturing an illuminated image of the glass and objects on the glass containing the ambient image plus reflected light from the illuminating of the glass, and subtracting the ambient image from the illuminated image to produce a moisture signal.

Ambient light and spurious (optical) signals contribute the main interfering signals in optical rain sensing. Characterizing and storing these signals permits their subsequent effective subtraction.

As disclosed in the co-pending application, a pulsed infrared (IR) light source is used to alternately illuminate image frames for a differential imaging rain sensor. The I.R. illuminant is used to obtain a signal proportional to the density of water drops that collect on the outer surface of a windshield. The use of synchronous detection permits a high degree of selectivity to be achieved since the radiation reflected from the water droplets is unique and can be discriminated over the background light level. Extraneous interfering signals may be subtracted differentially to obtain a net droplet reflection signal and thus a measure of water droplet density. Implicit in this method however, is the requirement that the background-subtracted signal remain invariant during the acquisition of the two images. Naturally, if the reference signal (frame) changes in the interval between successive image capture the basic operating premise is no longer valid. A stable reference requirement implies rapid image acquisition, storage and processing.

Alternately illuminating the area of interest on the windshield surface at high rates also requires that a high intensity pulsed radiant IR source be capable of high frequency modulation. Only solid state (light emitting diode-LED) and pulsed discharge sources are suitable for this purpose, as low cost incandescent lamps cannot be pulsed rapidly enough to be useful.

Differential, alternate image operation of an imaging rain sensor does significantly improve raindrop selectivity at moderate sensitivity. However the technique can be subject to poor false trigger immunity in certain conditions. The net imaging rate for a differential system is at least half that of a conventional (single ended) approach, and from experimental evidence, more like three times slower than the gross image capture rate. The reason for this disparity is that at least two image frames are necessary to yield one net differential frame; and in actual practice a third, wasted interleaving frame is often necessary as well.

Fast framing, typically at sixty net frames per second, is needed to prevent undesired activation (mis-triggering) of the wiping system by spurious, i.e., non-rain, signals. These non-rain artifacts are commonly image components that are not correlated in both differential image frames. Such signals are typically due to moving light sources or pulsed lights that are imaged onto the focal plane array. Given the need for rapid image frame acquisition and processing to prevent false triggering by extraneous lights, the use of differential image processing does in fact reduce rain sensor selectivity under certain conditions. In other words, trying to maintain a high degree of water droplet sensitivity will cause the system to mis-trigger or phantom wipe because it cannot acquire and process images quickly enough to reject spurious artifacts.

In spite of the application of other signal processing enhancements such as narrow band optical filtering and low f/number optics, the selectivity of prior-art imaging rain-sensors needs to be improved for many operating conditions. Certainly the advent of faster cameras and more rapid image processing will improve this situation in the future, but there is a compelling reason to use the current generation of very low cost integrated imagers, even with their lower framing rates.

SUMMARY OF THE INVENTION AND ADVANTAGES

In accordance with the subject invention, moisture on the exterior surface of a sheet of glass is sensed by illuminating the glass and objects on the glass with light rays at a first wavelength, capturing an illuminated image of the glass containing the first wavelength, simultaneously capturing an ambient image of light rays at a second wavelength passing through the glass from the exterior to the interior surfaces thereof, and comparing the images to produce a moisture signal.

This is accomplished with an assembly comprising an illuminator for illuminating the glass and objects on the glass with light rays at a first wavelength, a first image sensor element having a peak response at the first wavelength for capturing an illuminated image of the glass containing the first wavelength, a second image sensor element having a peak response at a second wavelength for capturing an ambient image of light rays at the second wavelength passing through the glass from the exterior to the interior surfaces thereof simultaneously with the capture by the first image sensor element, and a processor for comparing the simultaneously captured images to produce a moisture signal.

The present invention therefore provides an improvement wherein the imager is capable of capturing high rate, single frames that are then processed to yield a differential signal used to activate a wiper system.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
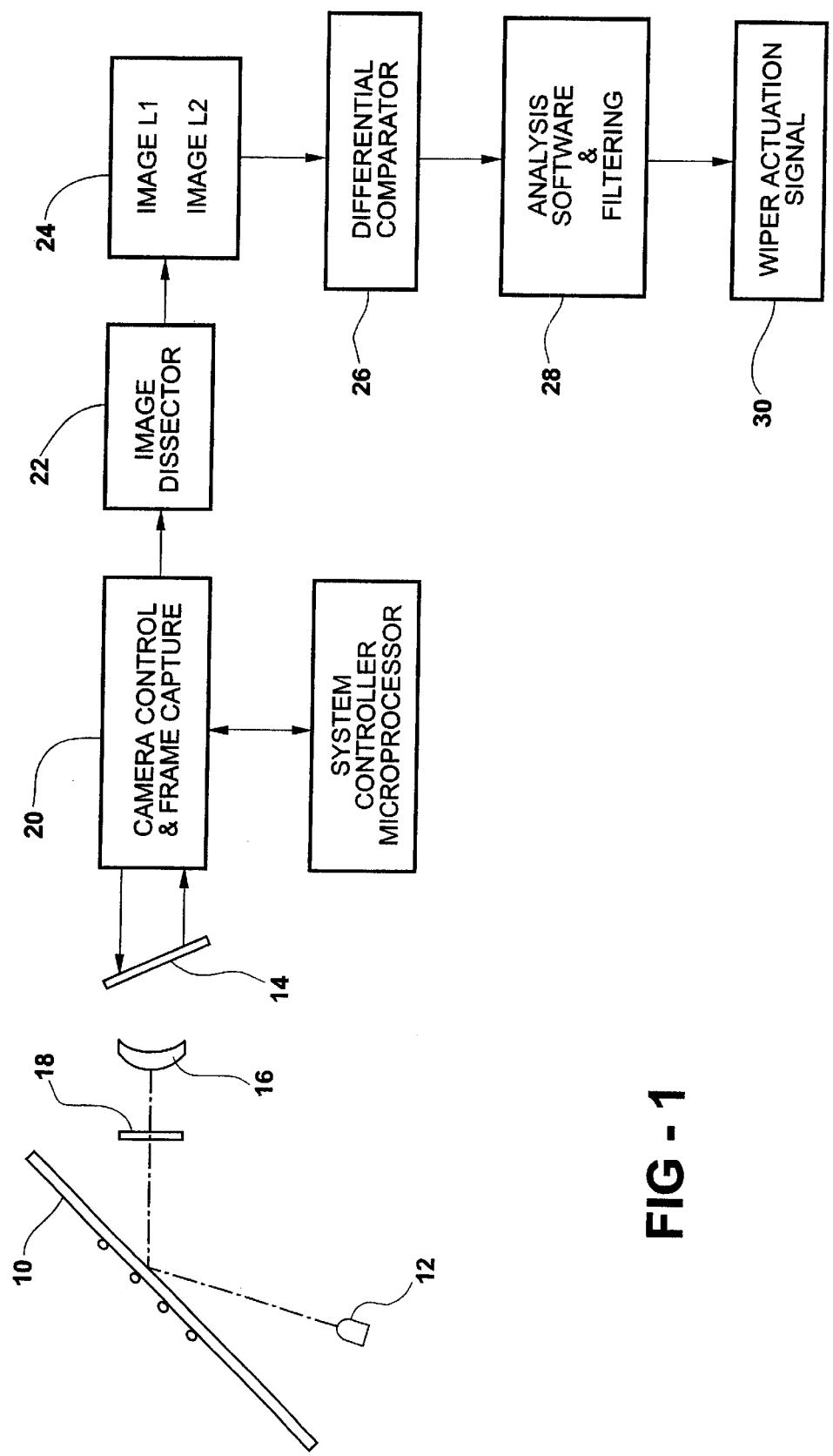
FIG. 1 is a block diagram of an assembly employing the subject invention.

Referring to the Figures, wherein like numerals indicate like or corresponding parts throughout the several views, an assembly for sensing moisture on the exterior surface of a sheet of glass 10 is illustrated in FIG. 1. The assembly comprises an illuminator 12 for illuminating the glass and objects on the glass with light rays at a first wavelength $\lambda 1$, preferably a continuously illuminated infrared light.

Figure 3:
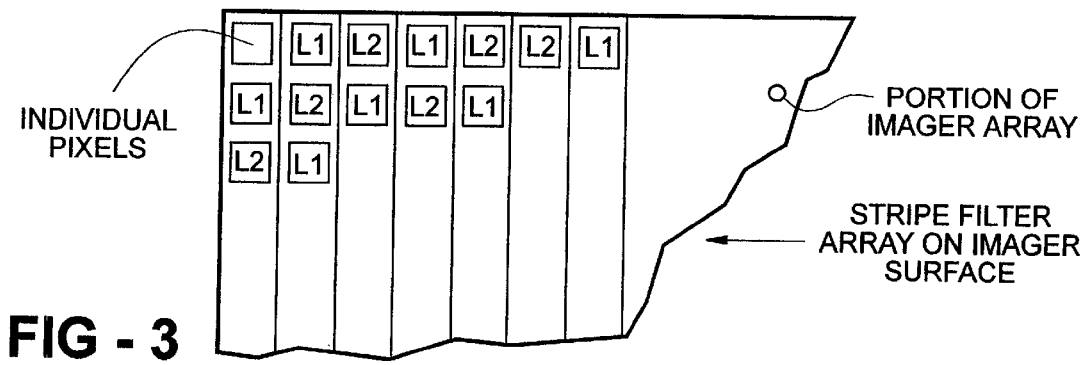
FIG. 3 is a fragmentary view showing a column or row array of first and second image sensor elements.
Figure 4:
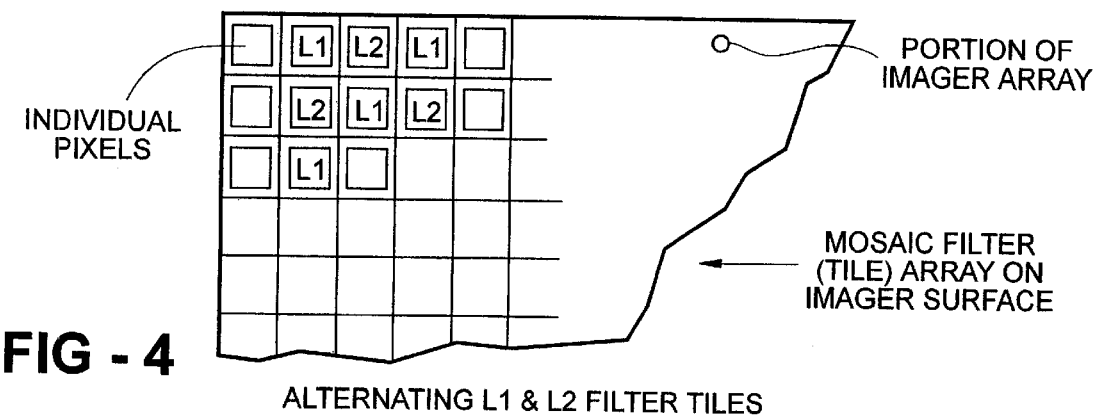
FIG. 4 is a fragmentary view showing a checkerboard array of first and second image sensor elements.

Also included is a first image sensor element L1 having a peak response at the first wavelength $\lambda 1$ for capturing an illuminated image of the glass containing the first wavelength $\lambda 1$. A second image sensor element L2 has a peak response at a second wavelength $\lambda 2$ for capturing an ambient image of light rays at the second wavelength $\lambda 2$ passing through the glass 10 from the exterior to the interior surfaces thereof simultaneously with the capture by said first image sensor element L1. Actually, the assembly includes a plurality of the first image sensor elements L1 and a plurality of the second image sensor elements L2, the first plurality L1 being interleaved with the second plurality L2 of image sensor elements. The interleaving may be by the first plurality L1 being in alternate horizontal rows or vertical columns, as shown in FIG. 3, or in a checkerboard array, as shown in FIG. 4. Each sensor element comprises an individual pixel disposed in an array over the single planer array 14.

Instead of storing two complete sequential images and differentially subtracting them, the present invention creates two simultaneous images from a specially interleaved, single imager 14. Similar image sensor elements are used in color video cameras to create the primary red, green and blue signals that are then combined to produce a full color image. Normally, a set of mosaic or stripe red, green and blue color filters, on the surface of the focal plane imager is used to perform the color separation. Instead of the traditional tri-color filters, the present invention would utilize a mosaic or stripe array of infrared band pass filters as shown in FIGS. 3 and 4. One filter over the first sensor elements L1 is chosen so that it selectively and preferentially transmits the first wavelengths $\lambda 1$ associated with the IR illuminator 12, while the second filter over the second sensor elements L2 is picked to selectively and preferentially transmit a nearby wavelength, not radiated to any degree by the illuminator 12. Typically the spacing of these first $\lambda 1$ and second $\lambda 2$ wavelengths would be on the order of 100 nm, and both frequencies would be nominally transmitted by the windshield material (glass 10 and coatings) and contained in similar amounts in ambient light, e.g., daylight.

The difference in spectral response of the first L1 and second L2 sensor elements is designed to impart a differential sensitivity to adjacent pixels in the focal-plane imaging array 14. That is, adjacent, alternating pixels, i.e., the first L1 and second L2 sensor elements, would exhibit a peak response at wavelengths $\lambda 1$ or $\lambda 2$ depending upon their physical position on the imager 14. The best resolution would be achieved if only single pixels were filtered by the alternating stripes or filter tiles as shown in FIG. 3. The checkerboard (tile or mosaic) bandpass filters shown in FIG. 4 may be applied by well known micro printing methods, using organic dyes or inks. Alternatively, photolithographic techniques could be used to create the filter array 14. Multi-layer interference or dielectric filters may be used to obtain enhanced wavelength selectivity but adequate performance has been seen in more conventional, resin-dye filters. While it may be argued that that such printed filters effectively decimate the imager and reduce resolution, the large number of active pixels in even the most modest imagers 14 allows for such division. Accordingly, a first filter may be disposed over each of one of the first L1 and second L2 image sensor elements for filtering light to one of the first $\lambda 1$ and second $\lambda 2$ wavelengths respectively.

A lens 16 is included for focusing the images onto the first L1 and second L2 image sensor elements. An optional infrared filter 18 may be employed to filter the illumination from the illuminator 12. The luminance signals derived from the selectively filtered pixels (sensor elements L1 and L2) in the focal plane array 14 are a function of the image projected onto the array 14 by the lens 16 or optical system.

As illustrated in FIG. 1, the assembly includes a processor for comparing the simultaneously captured images to produce a moisture signal. More specifically, the processor includes a camera control and frame capture unit 20, an image detector 22, an image storage unit 24, and a differential comparator 26. The comparator 26 algebraically sums the first and second images and an analyzer 28 analyzes and sets preset setpoints for initiating the moisture signal, i.e., the wiper activation signal 30.

The pixel luminance values of immediately adjacent pixels in a given row or column are subtracted from one another to create a differential signal. This difference signal may then be used to determine the presence of bona fide water drops on the windshield surface. In actual use, all rows or columns would contribute their respective delta or difference values that would then be added or summed algebraically to develop an aggregate difference level for the entire video frame. Such summation of all individual sensor elements L1 and L2 (pixel) differences will result in a more accurate picture of the water droplet density on the windshield 10 surface.

As noted, essentially simultaneous capture of the two image frames (by the unit 20) is advantageous for image processing purposes. Because the image acquisition rate is substantially increased, image smear is virtually eliminated so that moving objects in the imager field of view may be detected and disregarded. Spurious operation due to mistriggering is thereby minimized.

Figure 2:
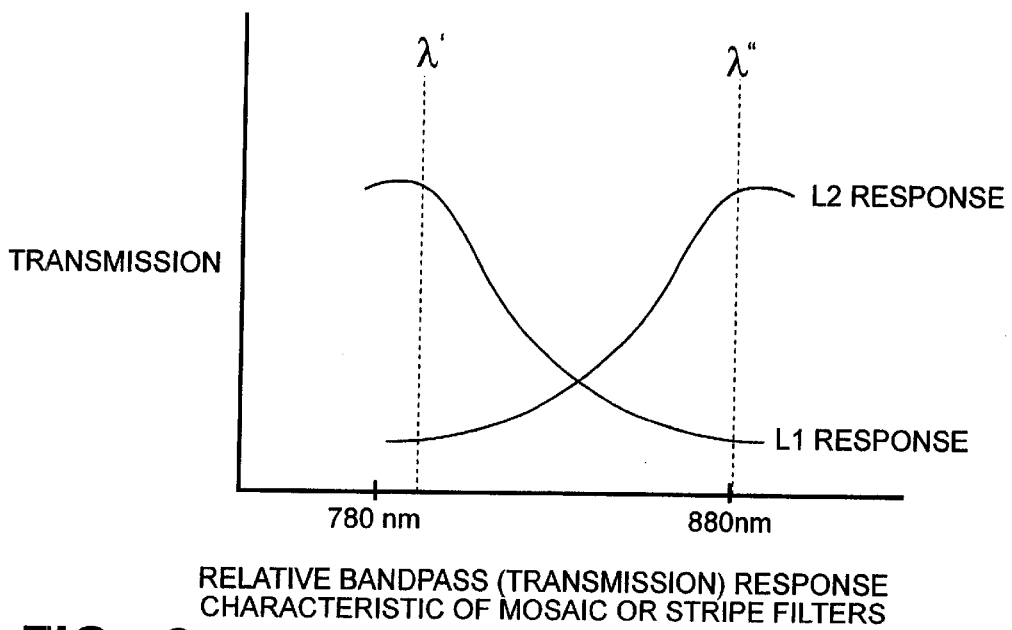
FIG. 2 is a graph showing the first and second wavelengths.
Figure 5:
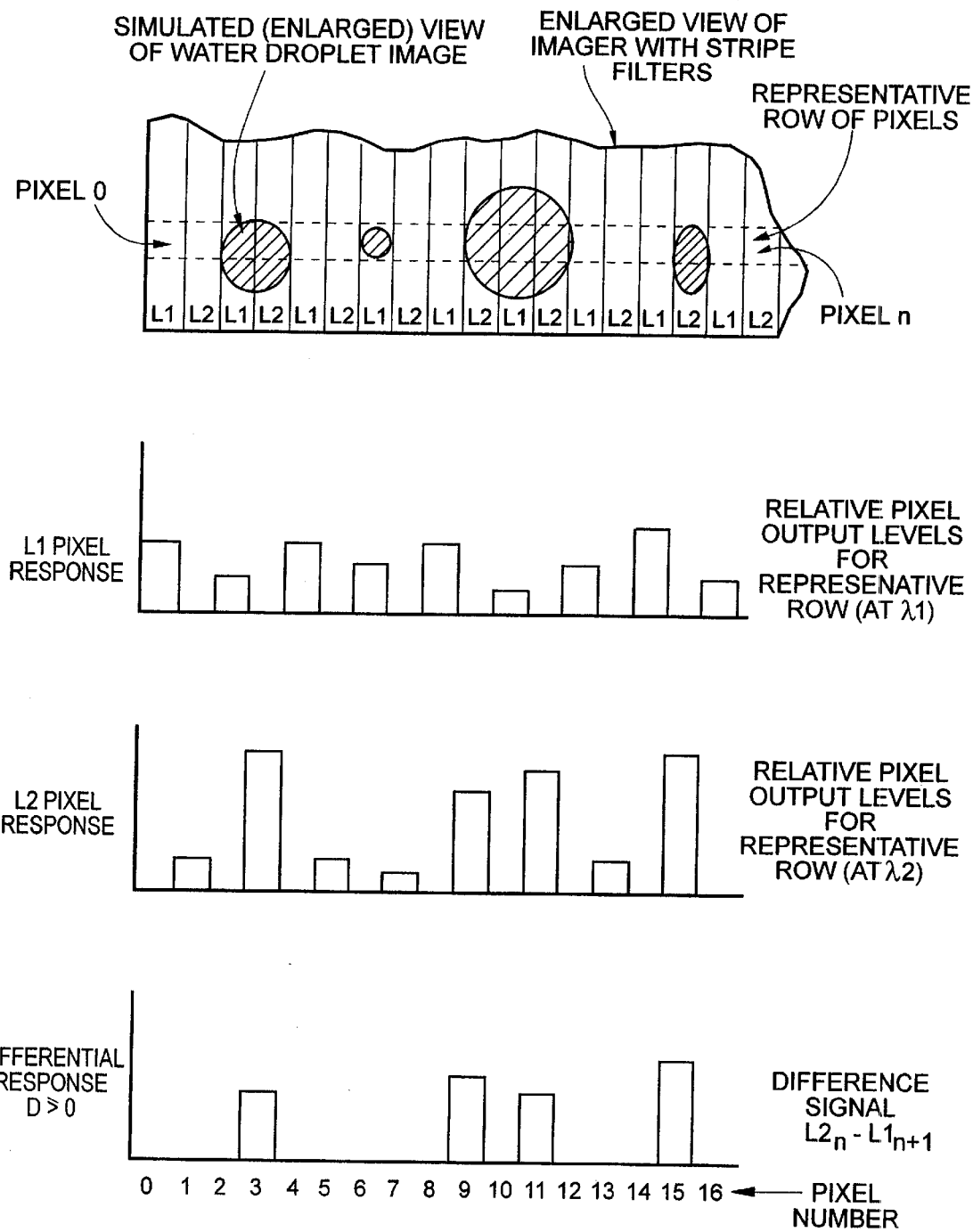
FIG. 5 is graphic presentation of the sensing steps to produce the moisture signal.

A diagrammatic representation of pixel luminance values is shown in FIG. 5, with alternate adjacent pixels being selectively filtered for either first $\lambda 1$ or second $\lambda 2$ wavelength response. That is, alternating pixels will be either most sensitive to ambient light $\lambda 2$ or to the radiant energy $\lambda 1$ from the illuminator 12. One means of deriving useful differential information from a single imager 14 involves the subtraction of signal levels from adjacent pixels that are sensitive to different wavelengths, ($\lambda 1$ or $\lambda 2$). The response graph shown for L1 merely indicates the expected pixel by pixel signals in an imager row, when illuminated by an image representing several small raindrops on the surface of the windshield 10. The assumption being that an infrared illuminating source 12 with peak emission at λ1 is preferentially reflected by drops on the glass 10. The image of those drops on one line (row or column) of the focal plane array 14 is shown schematically, occupying only the first fifteen pixels in that given row or column. As noted, alternate pixels are filtered differently, with either L1 or L2 filtering, providing either the L1 or the L2 filter bandpass response shown in FIG. 2.

The resulting subtraction of the adjacent pixel output values, $L2n-L1_{(n+1)}$ where n is the pixel number (index) in a given row, is shown as the differential response signal, which is directly proportional to the presence and density of water drops on the imaged surface. Note that not all of the drops are 'counted', and those drops with optical signatures smaller than one pixel may, in fact, fall on L1 filtered pixels, which are insensitive to the illumination 12 wavelength. (λ1).

It will be appreciated that a row is normally horizontal and a column is normally vertical, either may be employed and are equivalent or the same, even if mis-oriented.

In the implementation of a checkerboard (mosaic or stripe) filter disclosed in FIG. 1, the detected image is dissected to provide alternate luminance values for adjacent pixels. These luminance signals are digitally processed to yield differential values corresponding to the image features projected onto the focal plane array 14. Either singly (or on a row by row or column by column basis) or in aggregate (on a frame by frame basis) these difference values are processed to effect a wiper activation signal 30. Naturally, various filtering and/or averaging algorithms could be used in the unit 28 to optimize system response to varying conditions, such as light or heavy rain, fog, snow, etc.

The dual wavelength, intrinsically differential image sensor element of the present invention not only permits high image framing rates, but allows for the use of non-pulsed infrared illumination sources. Pulsed sources are not precluded as long as the source 12 can completely illuminate an entire image frame 14. Very low cost, efficient infrared (IR) sources such as incandescent lamps could be used to great advantage as these devices exhibit excellent performance and long life when operated at moderate filament temperature. In practice, these lamps would be filtered to attenuate any visible light that might distract a driver.

As will be appreciated, the invention provides a method for sensing moisture on the exterior surface of a sheet of glass 10 comprising the steps of illuminating 12 the glass and objects on the glass with light rays at a first wavelength λ1, capturing 20 an illuminated image of the glass and objects on the glass 10 containing the first wavelength λ1, while simultaneously capturing 20 an ambient image of light rays at a second wavelength λ2 passing through the glass 10 from the exterior to the interior surfaces thereof. Also included is the step of comparing 26 the images to produce a moisture signal 30.

The capturing 20 is further defined as capturing the illuminated image at a first plurality of image sensor elements L1 and capturing the ambient image at a second plurality of image sensor elements L2 interleaved with the first plurality L1 of image sensor elements. Preferably, the first wavelength λ1 is separated from the second wavelength λ2 by one hundred nm. The first plurality of image sensor elements L1 exhibit peak response at the first wavelength λ1 and the second plurality of image sensor elements L2 exhibit peak performance at the second wavelength λ2.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A method for sensing moisture on the exterior surface of a sheet of glass (10) comprising the steps of;

illuminating the glass (10) and objects on the glass with light rays at a first wavelength λ1, capturing an illuminated image of the glass (10) containing the first wavelength λ1 at a first plurality of image sensor elements, simultaneously capturing an ambient image of light rays at a second wavelength λ2 passing through the glass (10) from the exterior to the interior surfaces thereof at a second plurality of image sensor elements interleaved with the first plurality of image sensor elements, and comparing the images to produce a moisture signal.

2. A method as set forth in claim 1 wherein the first wavelength λ1 is separated from the second wavelength λ2 by one hundred nm.

3. A method as set forth in claim 1 wherein the first plurality of image sensor elements exhibit peak response at the first wavelength λ1 and the second plurality of image sensor elements exhibit peak performance at the second wavelength λ2.

4. An assembly for sensing moisture on the exterior surface of a sheet of glass (10) comprising;

an illuminator (12) for illuminating the glass (10) on objects on the glass with light rays at a first wavelength λ1, a plurality of first image sensor elements L1 having a peak response at the first wavelength λ1 for capturing an illuminated image of the glass (10) containing the first wavelength λ1, a plurality of second image sensor elements L2 interleaved with said first image sensor elements L1 and having a peak response at a second wavelength λ2 for capturing an ambient of light rays at the second wavelength λ2 passing through the glass (10) from the exterior to the interior surfaces thereof simultaneously with the capture by said first image sensor elements L1, and a processor for comparing the simultaneously captured images to produce a moisture signal.

5. An assembly as set forth in claim 4 wherein said first and second plurality of image elements are disposed in one of alternating rows and columns.

6. An assembly as set forth in claim 4 wherein said first and second plurality of image sensor elements are disposed in a checkerboard array.

7. An assembly as set forth in claim 4 wherein each of said sensor elements comprises a pixel.

8. An assembly as set forth in claim 7 including a first filter disposed over each of said first and second image sensor elements L1, L2 for filtering light to one of said first and second wavelqngths λ1, λ2.

9. An assembly as set forth in claim 4 including a lens for focusing said images onto said sensor elements.

10. An assembly as set forth in claim 9 wherein said processsor includes a comparator for algebraically summing the first and second images and an analyzer for setting preset setpoints for initiating the moisture signal.

* * * * *